(12) United States Patent
Hecker

(10) Patent No.: US 7,948,629 B2
(45) Date of Patent: May 24, 2011

(54) MICROSCOPE AND METHOD FOR TOTAL INTERNAL REFLECTION-MICROSCOPY

(75) Inventor: Andreas Hecker, Asslar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 538 days.

(21) Appl. No.: 12/063,613

(22) PCT Filed: Aug. 11, 2006

(86) PCT No.: PCT/EP2006/065276
§ 371 (c)(1),
(2), (4) Date: Feb. 12, 2008

(87) PCT Pub. No.: WO2007/020251
PCT Pub. Date: Feb. 22, 2007

(65) Prior Publication Data
US 2010/0171946 A1    Jul. 8, 2010

(30) Foreign Application Priority Data

Aug. 12, 2005  (DE) .......................... 10 2005 038 549
May 10, 2006   (DE) .......................... 10 2006 021 996

(51) Int. Cl.
*G01N 21/55* (2006.01)
(52) U.S. Cl. ..................................................... 356/445
(58) Field of Classification Search ........... 356/445–488
See application file for complete search history.

(56) References Cited

U.S. PATENT DOCUMENTS 5,760,950 A    6/1998  Maly et al.
6,504,653 B2   1/2003  Matthae et al.
6,833,916 B2 * 12/2004  Osipchuk et al. ............. 356/318

(Continued)

FOREIGN PATENT DOCUMENTS

DE            10108796         9/2002

(Continued)

OTHER PUBLICATIONS

Alexander Rohrbach, "Observing Secretory Granules with a Multiangle Evanescent Wave Microscope", Biophysical Journal, New York, US, vol. 78, No. 5, May 2000, pp. 2641-2654, XP-002315573.

*Primary Examiner* — Michael P Stafira
(74) *Attorney, Agent, or Firm* — Leydig, Voit & Mayer, Ltd.

(57) ABSTRACT

A microscope for total internal reflection microscopy. The microscope includes at least one light source configured to provide an illumination light to an illumination beam path for an evanescent illumination of a specimen so as to reflect the illumination light at an interface to the specimen or a specimen cover so as to return reflection light into the illumination beam path, an objective through which the illumination light and detection light are directable, a detection device, and a coupling device. The coupling device includes a mirror disposed in the illumination beam path. The mirror has a reflecting surface and a hole, the hole being configured to pass the illumination light there through so as to couple the illumination light into the illumination beam path. The reflecting surface is configured to couple out at least a part of the reflection light and to direct the coupled-out reflection light to the detection devices so as to enable determination from a beam path of the coupled-out reflection light, at least one of a quantifiable parameter and a qualifiable parameter of at least one of the evanescent illumination and an evanescent field created in the specimen.

16 Claims, 1 Drawing Sheet

| U.S. PATENT DOCUMENTS | | | | FOREIGN PATENT DOCUMENTS | | |
|---|---|---|---|---|---|---|
| 6,987,609 B2 | 1/2006 | Tischer et al. | | DE | 10143481 | 3/2003 |
| 7,042,638 B2 | 5/2006 | Gonschor et al. | | DE | 10217098 | 11/2003 |
| 7,196,787 B2 | 3/2007 | Uhl et al. | | DE | 10229935 | 1/2004 |
| 2002/0097489 A1 | 7/2002 | Kawano et al. | | DE | 10309269 | 9/2004 |
| 2004/0001253 A1 | 1/2004 | Abe et al. | | | | |

* cited by examiner

MICROSCOPE AND METHOD FOR TOTAL INTERNAL REFLECTION-MICROSCOPY

CROSS REFERENCE TO PRIOR APPLICATIONS

This application is a U.S. National Phase application under 35 U.S.C. §371 of International Application No. PCT/EP2006/065276, filed on Aug. 11, 2006 and which claims benefit to German Patent Application No. 10 2005 038 549.4, filed on Aug. 12, 2005 and to German Patent Application No. 10 2006 021 996.1, filed on May 10, 2006. The International Application was published in German on Feb. 22, 2007 as WO 2007/020251 A1 under PCT Article 21(2).

FIELD

The present invention relates to a microscope for total internal reflection microscopy, comprising at least one light source for the evanescent illumination, optionally comprising an adjustment unit for the illumination light and comprising an objective, whereby both the illumination light and the detection light are directed via the illuminating beam path through the objective, and whereby, for example, totally reflected illumination light (reflection light) at the interface to a specimen or specimen cover returns to the illuminating beam path.

The present invention also relates to a method for total internal reflection microscopy, whereby the evanescent illumination is provided via at least one light source, whereby the illumination light is optionally directed via an adjustment unit through an objective to a specimen, whereby both the illumination light and the detection light are directed via the illuminating beam path through the objective, and whereby preferably totally reflected illumination light (reflection light) at the interface to a specimen or specimen cover returns to the illuminating beam path, especially for use in a microscope according to the present invention.

BACKGROUND

In total internal reflection microscopy, the refractive behavior of light as it makes the transition from an optically denser medium to an optically thinner medium is utilized. Thus, for example, the transition from cover glass (n1=1.518) to water (n2=1.33) yields a critical angle of 61°, the angle of total reflection. Under the conditions of total reflection (angle $\geq 61°$), a standing evanescent wave is formed in the medium with the lower refractive index. The intensity of this wave drops exponentially relative to the distance from the interface. For this reason, fluorophores located far away from the interface are not excited. The background fluorescence is considerably reduced. The image contrast is improved in this process and the resolution is markedly raised at the same time. A prerequisite for the utilization of the phenomenon described above is a sufficiently large difference between the refractive indices of the cover glass and of the medium.

US 2002/0097489 A1 describes a microscope with evanescent illumination of a specimen. The microscope comprises a white-light source whose light is coupled into the specimen slide via a slit aperture through the microscope objective for purposes of evanescent illumination. The illumination light propagates in the specimen slide due to total internal reflection, whereby the specimen is only illuminated in the region of the evanescent field that extends from the specimen slide. Microscopes of this type are known by the acronym TIRFM (Total Internal Reflection Fluorescent Microscope). The z-resolution of TIRF microscopes is exceptionally good owing to the fact that the evanescent field extends only about 100 nm into the specimen.

DE 101 08 796 A1 describes a high-aperture objective, particularly for TIRF applications. The objective consists of a first lens having a positive refractive power, a second lens having a negative refractive power, whereby the focal distance ratio between the two lenses lies within the range from −0.4 to −0.1 and the total refractive power is greater than zero. Moreover, the objective comprises two positive lenses whose ratio of the diameter to the focal distance is greater than 0.3 and smaller than 0.6. Furthermore, the objective comprises a negative lens and a collector lens, whereby the negative lens faces the front group and the focal distance ratio between the negative lens and the collector lens is between −0.5 and −2.

DE 102 17 098 A1 describes an incident-illumination array for TIRF microscopy. The incident-illumination array contains a source of illumination that, during operation, emits a polarized illuminating beam bundle that propagates at an angle relative to the optical axis, and the array also comprises a deflecting device that deflects the illuminating beam bundle and couples it into the objective parallel to the optical axis. With this incident-illumination array, it is provided that the illuminating beam bundle emitted by the source of illumination has s-polarization and p-polarization directions with a phase differential and the deflecting device reflects the illuminating beam bundle x times, wherein $x=(n \times 180−d)/60°$.

DE 101 43 481 A1 describes a microscope for TIRM (Total Internal Reflection Fluorescent Microscopy). The microscope has a housing and an objective. The illumination light emitted by an illumination device can be coupled in by means of an adapter that can be slid into the microscope housing.

US 2004/0001253 A1 describes a microscope with an optical illumination system that allows a simple switching over between evanescent illumination and reflection illumination. The illumination system comprises a source of laser light whose light is coupled into an optical fiber. Moreover, a coupling-out optical system is provided that focuses the light coming out of the fiber in a rear focal point of the microscope objective. The optical fiber can be slid in a plane perpendicular to the optical axis of the microscope objective.

DE 102 29 935 A1 describes a device for the coupling in of light in a microscope. This is where a light-conducting fiber configured as a slider in the light field aperture plane directs the laser light onto the preparation. The present invention is particularly well-suited for the TIRF method.

In scanning microscopy, a specimen is illuminated with a light beam so that the detection light emitted by the specimen can be observed as reflection light or fluorescent light. The focus of an illumination light beam bundle is moved in a specimen plane by means of a controllable beam-deflecting device, usually by tilting two mirrors, whereby the deflection axes are usually perpendicular to each other, so that one mirror deflects in the x-direction while the other one deflects in the y-direction. The mirrors are tilted by means of, for instance, galvanometer setting elements. The output of the detection light coming from the object is measured as a function of the position of the scanning beam. Normally, the setting elements are fitted with sensors in order to determine the current position of the mirror. Especially in the case of confocal scanning microscopy, an object is scanned in three dimensions with the focus of a light beam.

A confocal scanning microscope generally comprises a source of light, a focusing optical system, with which the light from the source is focused onto a pinhole (the so-called excitation aperture), a beam splitter, a beam-deflecting device for beam control, a microscope optical system, a detection aperture and the detectors to detect the detection light or fluorescent light. The illumination light is coupled in by means of a beam splitter. The fluorescent light or reflection light coming from the object returns to the beam splitter via the beam-deflecting device, passes through the beam splitter in order to be subsequently focused on the detection aperture downstream from which the detectors are located. This detection arrangement is called a descan arrangement. Detection light that does not stem directly from the focus region takes a different light path and does not pass through the detection aperture, so that point information is obtained that yields a three-dimensional image as a result of sequential scanning of the object with the focus of the illumination light beam bundle. For the most part, a three-dimensional image is obtained by means of layerwise image data acquisition.

With the microscopes known from the state of the art, the evanescent illumination is regularly coupled in within the scope of two-dimensional solutions, even if the adjustment unit used in such cases is always configured one-dimensionally. Thus, the coupling-in is done, for instance, by means of a so-called neutral splitter, that is to say, by means of a mirror that reflects light to a certain extent and otherwise transmits light. Coupling-in by means of a dichroitic splitter is also known. In this case, it is a special mirror that, except for one specific wavelength, reflects all other wavelengths. Another known approach is coupling-in by means of a polarization splitter. Here, the lasers for the evanescent illumination (TIRF illumination) and the laser for the conventional epi-fluorescent illumination are polarized orthogonally with respect to each other and then combined. As a one-dimensional possibility for coupling in the requisite source of radiation, it is likewise already known to use small additional mirrors in the illuminating beam path for the epi-fluorescent illumination.

When it comes to realizing evanescent illumination (TIRF illumination), the state of the art fundamentally couples in the illumination light either on the objective side or on the condenser side. The back-reflections created by the evanescent illumination are, in turn, coupled out and, normally, reflected into a light trap in order to avoid scattered light or parasitic reflections. So far, the returning reflection light is actually detrimental some and consequently has to be "disposed of".

DE 103 09 269 A1 describes the approach of utilizing the illumination light for purposes of laser protection. Towards this end, when the illumination light is coupled in, part of the light output is coupled out and subsequently mirrored onto a detector. By the same token, part of the light output is mirrored out within the scope of the coupling-out and, in turn, focused onto a detector. If the intensity ratio falls below a certain value, then the light source of the coupled-in illumination light—usually the illumination light of a coupled-in laser—is switched off by means of a protective device provided especially for this purpose.

The microscopes and methods known for total internal reflection microscopy from the state of the art are disadvantageous insofar as, when the beam is directed rotation-symmetrically, it is not possible to quantitatively determine the penetration depth that is to be achieved for the evanescent field that is being created in the specimen. This is due to the normally unknown refractive index of the specimen to be examined. If the refractive index of the specimen is known, the penetration depth can be calculated in a familiar manner from the known refractive index and angle of incidence of the evanescent illumination light beam relative to the specimen. Moreover, when different specimens are being examined, one is confronted with different refractive indices so that it is difficult to calculate the angle of total reflection. Consequently, an automatic setting of the evanescent illumination seems to be ruled out. When the beam is directed non-rotation-symmetrically, a homogeneously rotation-symmetrical irradiation of the TIRF illumination is hardly possible.

SUMMARY

An aspect of the present invention is putting forward a microscope for total internal reflection microscopy and a corresponding method by means of which it is possible to automatically set the evanescent illumination when the beam is directed rotation-symmetrically.

In an embodiment, the present invention provides for a microscope for total internal reflection microscopy. The microscope includes at least one light source configured to provide an illumination light to an illumination beam path for an evanescent illumination of a specimen so as to reflect the illumination light at an interface to the specimen or a specimen cover so as to return reflection light into the illumination beam path, an objective through which the illumination light and detection light are directable, a detection device, and a coupling device. The coupling device includes a mirror disposed in the illumination beam path. The mirror has a reflecting surface and a hole, the hole being configured to pass the illumination light there through so as to couple the illumination light into the illumination beam path. The reflecting surface is configured to couple out at least a part of the reflection light and to direct the coupled-out reflection light to the detection devices so as to enable determination from a beam path of the coupled-out reflection light, at least one of a quantifiable parameter and a qualifiable parameter of at least one of the evanescent illumination and an evanescent field created in the specimen.

BRIEF DESCRIPTION OF THE DRAWING

The present invention is described in greater detail below on the basis of embodiments and of the drawing in which.

DETAILED DESCRIPTION

Figure 1:
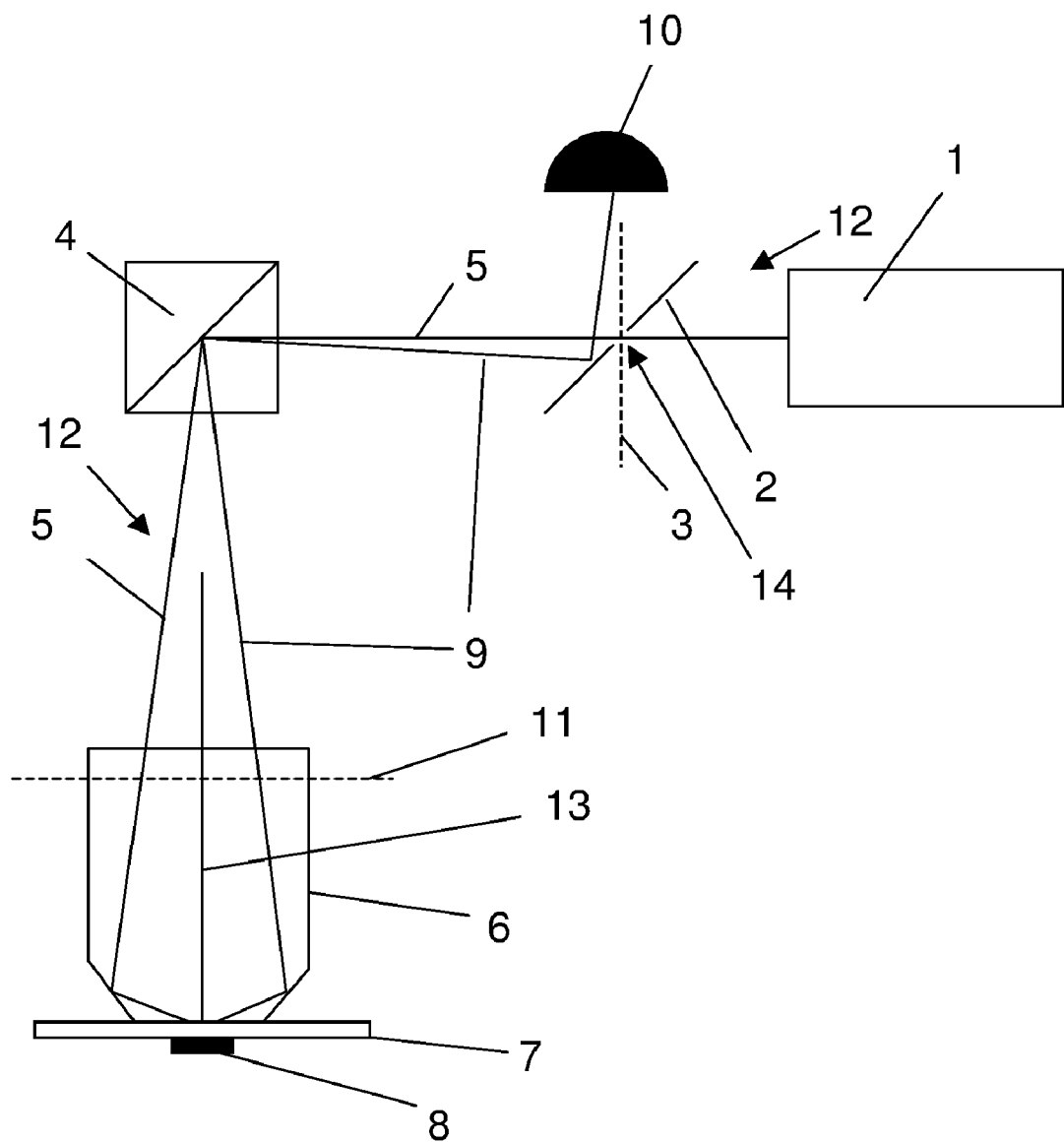
FIG. 1: shows a schematic view of the basic set-up of a microscope according to the present invention in order to explain the method according to the present invention, whereby only the features that are relevant for the present invention are shown.

According to the present invention, it has been recognized that, in order to automatically set the evanescent illumination, it is necessary to know the refractive index of the specimen, of the specimen glass and/or of the specimen cover, that is to say, of the object to be examined. In this context, it should be pointed out that an automatic setting of the evanescent illumination is geared towards a quantifiable penetration depth of the evanescent field in the specimen. Particularly with a change in the preparation or in the nutrient solution, reproducible settings should be possible and, for this purpose, it is necessary to know the refractive index.

According to the present invention, the microscope comprises an integrated device with which it is possible to ascertain the refractive index of the specimen in a conventional TIRF set-up and to derive information from this about the requisite properties, after which the operation or the settings can be automated.

It has also been recognized according to the present invention that, for automatic operation, it must be possible to quantitatively determine and thus to set the penetration depth of the evanescent field. Once the refractive index of the specimen is known, the penetration depth can be calculated from the refractive index and from the angle of incidence of the illumination light beam.

In concrete terms, with the microscope according to the present invention, the actually detrimental reflection light is coupled out of the illumination beam path, namely, either completely or else at least partially. The coupled-out reflection light is fed to detection means, after which quantifiable and/or qualifiable parameters of the evanescent illumination and/or of the evanescent field being created in the specimen can be derived from the beam path of the coupled-out reflection light.

The parameters under discussion here comprise information about the position of the illumination light beam in the entrance pupil of the objective. Moreover, the parameters allow conclusions about the angle of incidence of the illumination light beam onto the interface of the specimen. As already mentioned above, the parameters serve to calculate the refractive indices of the specimen, from which additional information can then be derived.

Furthermore, it should be pointed out that the coupled-out reflection light is advantageously focused onto the detection means.

In an advantageous manner, the means for coupling out the reflection light can be adapted to the configuration of the reflection light, whereby, concretely speaking, they can be adapted to a two-dimensional configuration of the reflection light. In terms of the design, it is possible that the means to spatially separate the reflection light from the illumination light comprise existing components, namely, for example, an x-y scanner. In addition to its actual scanning function, this x-y scanner then serves to deflect the reflection light mirrored on the optical axis into the reflection beam path, so that the reflection light is separated from the incident illumination light. This is where the coupled-out reflection light is fed to the detection means.

In a simple design, the means for coupling out the reflection light can be a mirror.

The above-mentioned means for detecting the coupled-out reflection light can be advantageously provided with a detector with position resolution, so that it is possible to obtain information about the position of the illumination light beam in the entrance pupil of the objective. The detector can be configured as a CCD (charge coupled device). By the same token, it is conceivable for the detector to be configured as a position-resolving photodiode (PSD, position sensitive device). As an alternative, it is conceivable for the means for detecting the coupled-out reflection light to encompass a combination of a conventional detector and a sensor arranged in the illuminating beam path on the adjustment unit for positioning the light source, so that likewise, quantitative information as well as position-specific information can be acquired. The detector can be configured here as a photodiode.

It is fundamentally possible for the arrangement of the means for the coupling-out and detection of the reflection light to be configured asymmetrically. A rotation-symmetrical configuration around the optical axis is advantageous, especially since the coupled-in illumination light or the coupled-in illumination light beam turns correspondingly.

Regarding the evanescent illumination light, it should be pointed out that this light can also be coupled in by means of condenser coupling-in or prism coupling-in. Any desired modality for coupling in the evanescent illumination light is conceivable.

In an embodiment, the present invention provides for a method for total internal reflection microscopy using an evanescent illumination provided via at least one light source. The method includes directing an illumination light via an illumination beam path through an objective to a specimen; directing a detection light via the illuminating beam path through the objective; returning to the illuminating beam path a reflection light produced by reflection of the illumination light at an interface to at least one of the specimen and a specimen cover; coupling at least a portion of the reflection light out of the illumination beam path; detecting the coupled-out reflection light; and determining from a beam path of the coupled-out reflection light at least one of a quantifiable parameter and a qualifiable parameter of at least one of the evanescent illumination and an evanescent field created in the specimen.

Regarding the method according to the present invention, the method can advantageously be employed for a microscope according to the present invention. For this purpose, the returning reflection light in the illuminating beam path— according to the elaborations above—is at least partially coupled out of the illuminating beam path and is detected in the additional beam path thus created. Quantifiable and/or qualifiable parameters of the evanescent illumination and/or of the evanescent field being created in the specimen are derived from the beam path of the coupled-out reflection light. In order to avoid repetitions, reference is hereby made to the elaborations above.

The adjustment unit should moreover be calibrated before the parameters are ascertained. In order to calibrate the adjustment unit, a specimen having a known refractive index can be used and appropriately illuminated.

The adjustment unit moves the illumination beam from a high numerical aperture in the direction of a low numerical aperture, as a result of which the intensities and positions of the reflection light can be detected. Shortly before the angle of total reflection has been reached, the intensity measured on the detector is 100%. Shortly after the angle of total reflection has been exceeded, the intensity will have dropped to 0%. On this basis, the position of the total reflection can be determined, namely, by means of the above-mentioned transition.

As already explained above, the angle of total reflection can be calculated from the known refractive index of the specimen. Once the adjustment unit has been calibrated, the angle of incidence is calculated on the basis of the position of the total reflection.

For specimens having a known refractive index, the penetration depth of the evanescent field can be quantitatively determined. Consequently, when it comes to specimens having a known refractive index, for example, with an eye towards the desired penetration depth of the evanescent field, the evanescent illumination can be set in a targeted manner, for example, also for automatic operation.

For specimens having an unknown refractive index, the latter can be ascertained or measured within the scope of the elaborations made above. For this purpose, the specimen is illuminated and the position of the total reflection is ascertained in accordance with the explanations made above. Once the adjustment unit has been calibrated, the angle of total reflection can be calculated from the position and the refractive index of the specimen can be calculated from the angle. Once the refractive index has been determined, especially with an eye towards the desired penetration depth of the evanescent field, the illumination can be set, for example, automatically.

Different possibilities exist for configuring and refining the teaching of the present invention in an advantageous manner. For this purpose, reference is hereby made, on the one hand, to the claims that are subordinate to the independent claims and, on the other hand, to the explanation below of a preferred embodiment of the present invention making reference to the drawing.

Thus, FIG. 1 shows the schematic set-up of a microscope according to the present invention, comprising the essential components for total internal reflection microscopy. The microscope comprises a light source 1 for the evanescent illumination. This is preferably a source of laser light.

Moreover, a mirror 2 with a hole and an adjustment unit 4 is provided, whereby the adjustment unit 4, for instance, an x-y scanner, can comprise, for example, a stepping motor that serves to deflect the illumination light beam. The hole in the mirror is approximately the same size as the diameter of the illumination light beam 5 at that place of the mirror 2. The mirror 2 is located in or in the vicinity of a plane 3 that is conjugated with respect to the plane of the objective pupil 11. Via the adjustment unit 4, the illumination light reaches an objective 6 via the illuminating light/beam path 5. The illumination light/beam path 5 is conducted through the objective 6 in such a way that, at an angle of total reflection, it strikes the specimen 8 that is held by a transparent specimen slide 7 on the side that is opposite from the objective. Under the conditions of total reflection, a standing evanescent wave is created in the specimen, the intensity of said wave falling exponentially as a function of the distance to the interface. The specimen 8 emits detection light 13. Reflection light 9 reflects off the specimen slide 7.

It can also be seen in FIG. 1 that the illumination light 5 as well as the detection light 13 are directed via the illuminating beam path 12 through the objective 6, whereby, at the interface to the object or to the specimen 8 or specimen cover, totally reflected illumination light, that is to say, reflection light 9, returns into the illuminating beam path 12 and is directed via the adjustment unit 4.

According to the present invention, a mirror 2 having a hole 14 to couple the returning reflection light 9 out of the illuminating beam path 12 is provided in the illuminating beam path 12. Due to the offsetting of the reflection light 9 during the total reflection, the reflection light no longer strikes the identical beam path of illumination light between the light source 1 and the adjustment unit 4. As a result, the reflection light 9 does not strike the hole 14 in the mirror but rather the surface of the mirror 2 facing the return beam path and is then conducted to the detector 10, so that quantifiable and/or qualifiable parameters of the evanescent illumination and/or of the evanescent field being created in the specimen 8 can be derived from the reflection light 9. For this purpose, it is necessary for the detector 10 to function with position resolution or else another detector device has to be associated with the adjustment unit 4.

In reference to FIG. 1, it should be pointed out that, in order to generate evanescent illumination, in other words, a TIRF illumination, it is necessary to couple an additional light source into the beam path, along with the usual illumination light source, namely, the single light source 1 shown for purposes of the evanescent illumination. Evanescent illumination is then generated by means of the objective 6 in order to create an evanescent field in the specimen 8. Under the condition of total reflection at the interface to the specimen 8, the illumination light 5 emerges again at the place that is diametrically opposite from the entrance, and it then traverses the beam path in the opposite direction so as to be slightly offset symmetrically to the optical axis. The returning light beam designated as reflection light 9 is partially or completely mirrored out or coupled out and focused onto the detector 10. The entire beam path is designed in such a way that information is obtained about the position of the illumination light beam in the entrance pupil of the specimen 8 and, on this basis, the angle of incidence onto the interface can be derived. The arrangement needed for this purpose can comprise a detector 10 with position resolution in the blocked beam path, as has been comprehensively elaborated upon above. By the same token, it is possible to implement a combination of a detector 10, for instance, a photodiode, and another sensor on the adjustment unit 4 in order to position the illumination light beam.

The set-up shown in FIG. 1 can be configured rotation-symmetrically around the optical axis, although non-rotation-symmetrical arrangements are likewise conceivable and feasible.

The method for measuring the refractive indices can moreover be used for any desired modality for coupling in the evanescent illumination. The condenser coupling-in or prism coupling-in have already been mentioned above.

Regarding the determinations of the relevant parameters, it should be mentioned with reference to FIG. 1 that the adjustment unit 4 can be calibrated in a first step. For this purpose, a specimen 8 having a known refractive index can be placed under the microscope and illuminated. Subsequently, using the preferably automatic adjustment unit 4, the illumination light 5 can be moved from a high numerical aperture in the direction of a low numerical aperture. The individual intensities and positions are ascertained on the basis of the set-up explained above, especially using appropriate detectors. Shortly before the angle of total reflection has been reached, the measured intensity on the detector is still 100%. Shortly after the angle of total reflection has been exceeded, the intensity is 0%. The position of the total reflection can be determined on the basis of the transition. The angle of total reflection can be calculated if the refractive index is known. The adjustment unit 4 can be calibrated accordingly and a conclusion about the angle of incidence can be drawn from the position.

Therefore, in the case of specimens having a known refractive index, it is possible to automatically set the evanescent illumination, which then yields the appertaining penetration depth of the evanescent field.

In the case of specimens having an unknown refractive index, it is necessary to first ascertain or measure this value. Towards this end, the specimen 8 is illuminated, whereby the position during the total reflection can be ascertained by means of the method described above. If a calibrated adjustment unit 4 is used, the angle can be calculated directly from the position and the refractive index can be calculated from the angle. On the basis of the now known refractive indices, the evanescent illumination can be automatically set for the subsequent specimens of the same type, and the penetration depth of the evanescent field can then be quantitatively determined.

Regarding the features that cannot be gleaned from the single figure, in order to avoid repetitions, reference is hereby made to the general description and to the claims.

Finally, it should be pointed out that the embodiment elaborated upon above serves exclusively to describe the claimed teaching, without restricting the teaching to this embodiment.

LIST OF REFERENCE NUMERALS 1 light source
2 mirror
3 conjugated objective pupil plane
4 adjustment unit (e.g. x-y scanner)
5 illumination light 6 objective
7 specimen slide
8 specimen
9 reflection light
10 detector
11 plane of the objective pupil
12 illumination beam path
13 detection light
14 hole in the mirror

The invention claimed is:

1. A microscope for total internal reflection microscopy, the microscope comprising:
   at least one light source configured to provide an illumination light to an illumination beam path for an evanescent illumination of a specimen, the illumination light being reflected at an interface to the specimen or a specimen cover so as to return reflection light into the illumination beam path;
   an objective through which the illumination light and detection light are directable;
   a coupling device including a mirror disposed in the illumination beam path, the mirror having a reflecting surface and a hole, the hole being configured to pass the illumination light therethrough so as to couple the illumination light into the illumination beam path, the reflecting surface couples out at least a part of the reflection light and directs the coupled-out reflection light to a detection device configured to detect a position of the coupled-out reflection light so as to enable determination of at least one of a quantifiable parameter and a qualifiable parameter of at least one of the evanescent illumination and an evanescent field created in the specimen, and
   an adjustment unit disposed in the illumination beam path downstream of the coupling device and configured to adjust the illumination light based on the detected position of the coupled-out reflection light so as to provide the evanescent illumination of the specimen.

2. The microscope as recited in claim 1, wherein a diameter of the hole is the same as a diameter of a beam of the illumination light.

3. The microscope as recited in claim 1, wherein the reflection light strikes the reflecting surface at a position displaced from the hole so as to direct the coupled-out reflection light to the detection device.

4. The microscope as recited in claim 1, wherein the coupling device is disposed in or in the vicinity of a plane conjugated with respect to a plane of the objective pupil.

5. The microscope as recited in claim 1, wherein the at least one of the quantifiable parameter and the qualifiable parameter includes information on a position of a beam of the illumination light in an entrance pupil of the objective.

6. The microscope as recited in claim 1, wherein the at least one of the quantifiable parameter and the qualifiable parameter includes information on an angle of incidence of a beam of the illumination light onto the interface.

7. The microscope as recited in claim 1, wherein the at least one of the quantifiable parameter and the qualifiable parameter is usable to calculate refractive indices of the specimen.

8. The microscope as recited in claim 1, wherein the coupled-out reflection light is focused onto the detection device.

9. The microscope as recited in claim 1, wherein the coupling device is adapted to a shape of the reflection light.

10. The microscope as recited in claim 1, wherein the coupling device is adapted to a two-dimensional shape of the reflection light.

11. The microscope as recited in claim 1, wherein the detection device includes a detector with position resolution.

12. A method for total internal reflection microscopy using an evanescent illumination provided via at least one light source, the method comprising:
    directing an illumination light via an adjustment unit disposed in an illumination beam path to a specimen;
    directing a detection light via the illumination beam path through the objective;
    returning to the illumination beam path a reflection light produced by reflection of the illumination light at an interface to at least one of the specimen and a specimen cover;
    coupling at least a portion of the reflection light out of the illumination beam;
    detecting, by a detector, a position of the coupled-out reflection light;
    determining from the detected position of the coupled-out reflection light at least one of a quantifiable parameter and a qualifiable parameter of at least one of the evanescent illumination and an evanescent field created in the specimen; and
    adjusting the illumination light via the adjustment unit based on the determined at least one of a quantifiable parameter and a qualifiable parameter so as provide the evanescent illumination in the specimen.

13. The method as recited in claim 12, further comprising calculating an angle of total reflection from a known refractive index of the specimen.

14. The method as recited in claim 12, further comprising quantitatively determining a penetration depth for a specimen with a known refractive index.

15. The method as recited in claim 12, further comprising ascertaining or measuring a refractive index of a specimen with an unknown refractive index.

16. The method as recited in claim 12, further comprising ascertaining a position of total reflection by illuminating the specimen.

* * * * *